United States Patent [19]

Inbar

[11] 4,239,332
[45] Dec. 16, 1980

[54] SELF-ALIGNING FIBER OPTIC RELAY

[75] Inventor: Michael Inbar, Torrance, Calif.

[73] Assignee: TRW Inc., Los Angeles, Calif.

[21] Appl. No.: 29,624

[22] Filed: Apr. 13, 1979

[51] Int. Cl.³ .............................................. G02B 5/14
[52] U.S. Cl. ................................................. 350/96.20
[58] Field of Search .................... 350/96.20, 96.21; 250/229; 340/365 P

[56] References Cited

U.S. PATENT DOCUMENTS

| 4,033,669 | 7/1977 | Hanson | 350/96.20 |
| 4,087,155 | 5/1978 | Deacon | 350/96.20 |
| 4,088,387 | 5/1978 | Lewis | 350/96.20 |
| 4,148,558 | 4/1979 | Schuck | 350/96.20 |
| 4,150,870 | 4/1979 | d'Auria | 350/96.20 |

FOREIGN PATENT DOCUMENTS 1946693  8/1970  Fed. Rep. of Germany ........ 350/96.20

Primary Examiner—Stewart J. Levy
Attorney, Agent, or Firm—Martin R. Horn

[57] ABSTRACT

This invention provides for a relay apparatus for use with optical fibers. A first set of optical fiber ends is mechanically secured in a suitably shaped retainer. A second set of optical fiber ends is secured in a second retainer appropriately shaped to move into one of a plurality of mechanically stable positions with respect to the first retainer when biased against the first retainer. These mechanically stable positions bring members of the first and second set of optical fibers into optical alignment. A switching mechanism is provided for moving the first retainer across the second retainer thereby making and breaking optical connections between the first and second set of optical fiber ends. In one embodiment, the retainers are cooperatively shaped by hemispheres, which define a set of mechanically stable alignment positions.

30 Claims, 14 Drawing Figures

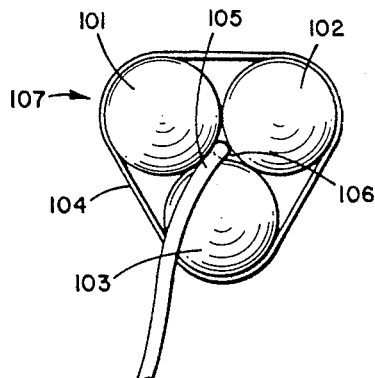
Fig. 1
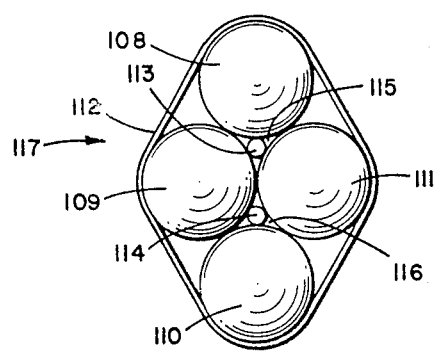
Fig. 2
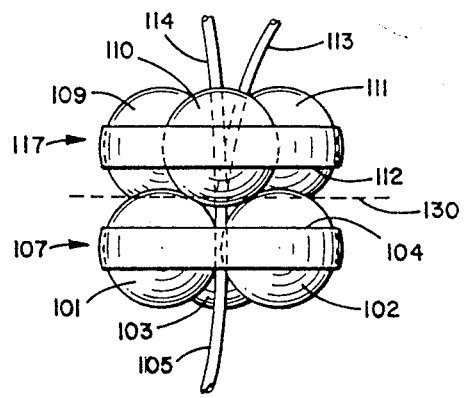
Fig. 3
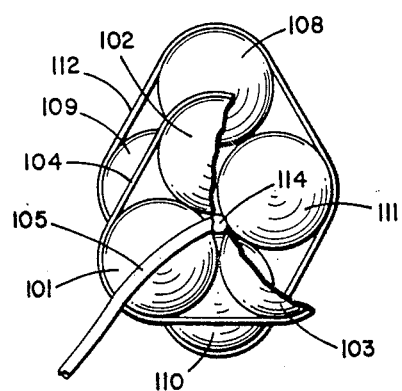
Fig. 4A
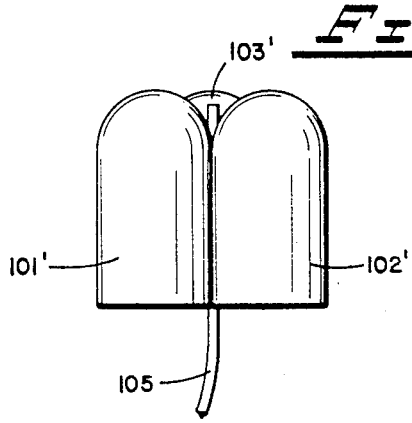
Fig. 7
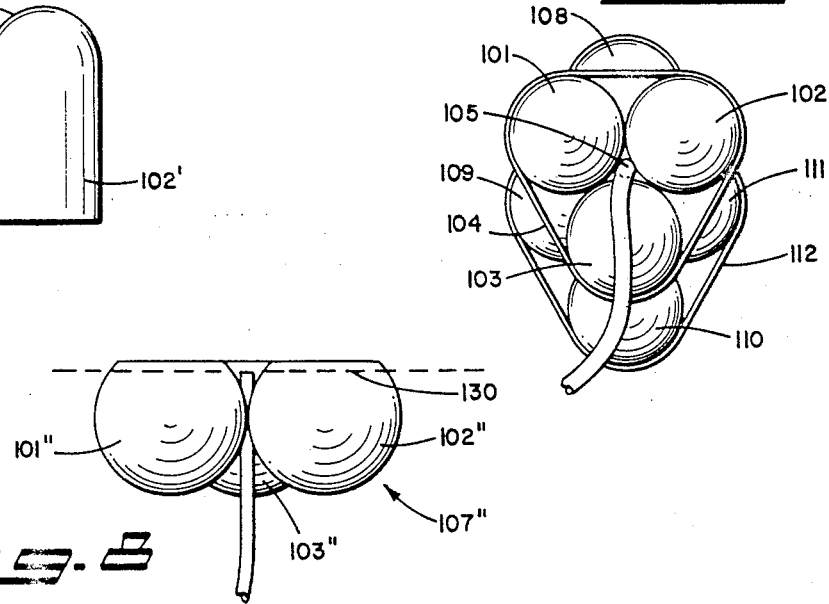
Fig. 4B
Fig. 8

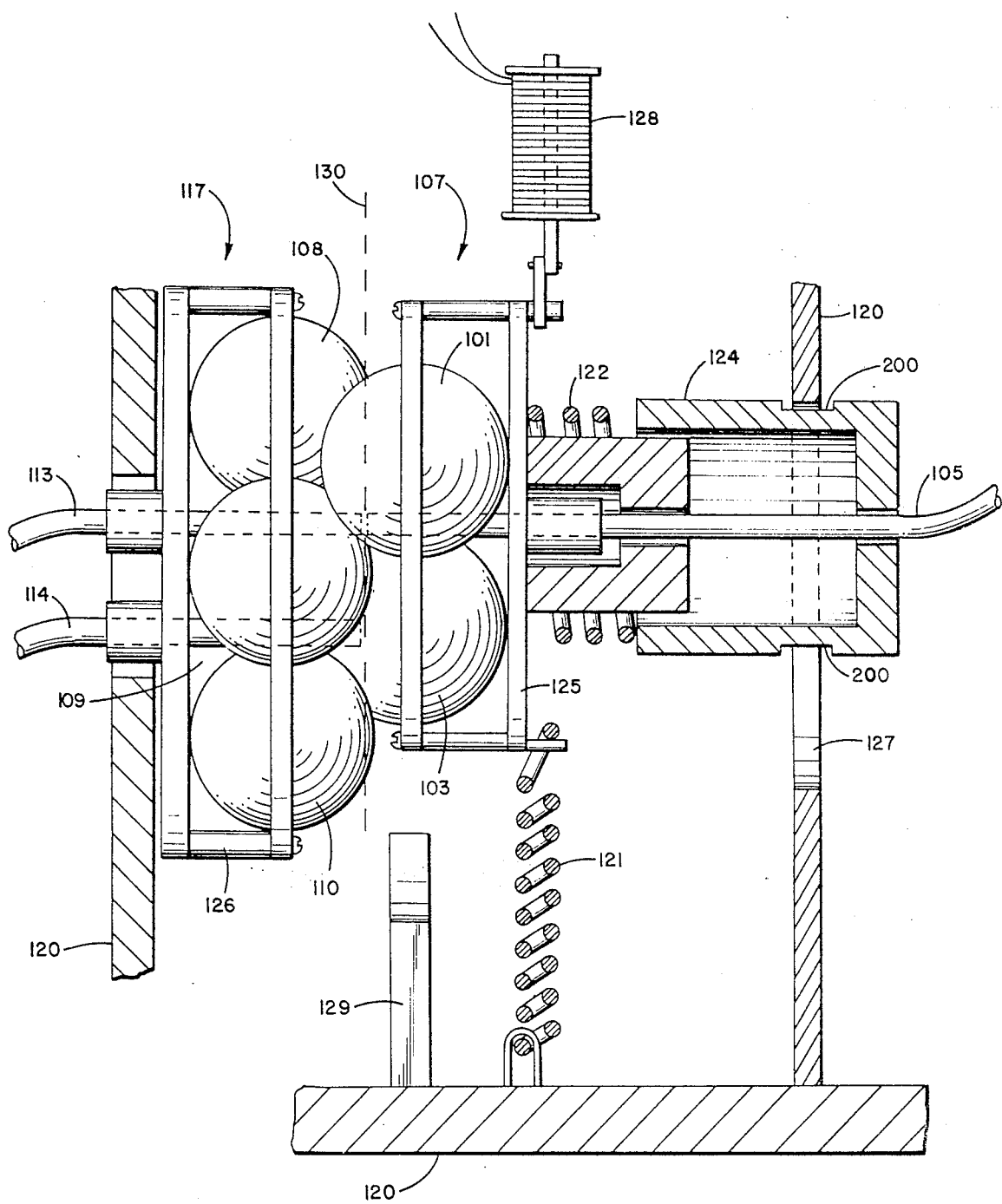

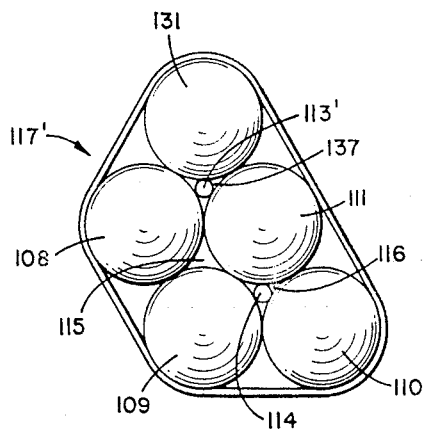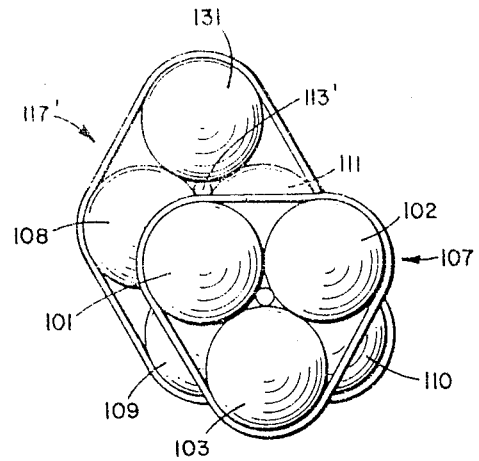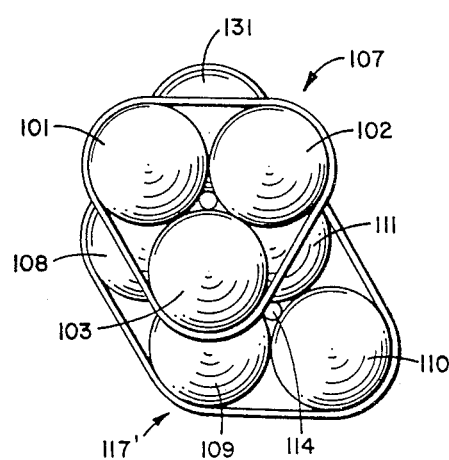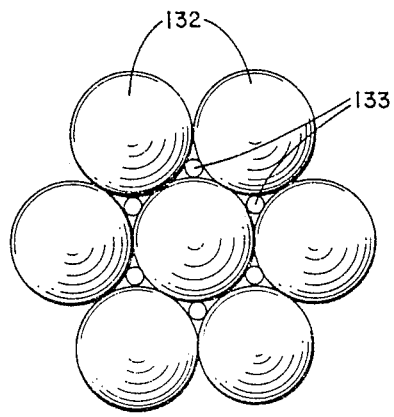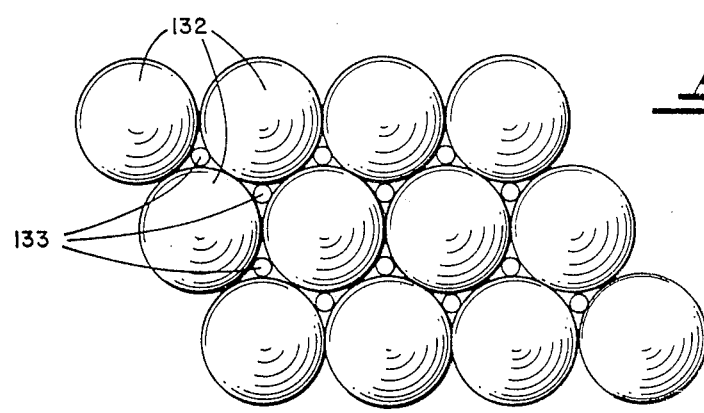

SELF-ALIGNING FIBER OPTIC RELAY

BACKGROUND OF THE INVENTION

1. Field of the Invention

The herein disclosed invention relates to an apparatus for mechanically creating and breaking optical connections between a first set of optical fiber ends and a second set of optical fiber ends.

2. Prior Art

Fiber optic technology is finding increasing application in industry. This technology offers an alternative information transmission medium which is increasingly surplanting use of microwave waveguides, radio frequency coaxial cables, etc. where a high bandwidth, reliable transmission link must be established. Optical fibers provide a transmission medium for electromagnetic radiation in the visible and near-visible light region of the electromagnetic frequency spectrum. Since such frequencies are substantially higher than those in the radio wave and microwave portion of the electromagnetic spectrum, a greater amount of information may be transferred via an optical fiber due to the higher information bandwidth possible at such frequencies.

Optical fibers are light-transparent glass threads typically having a diameter of 0.01 inch or less. Two major problems with fiber optical technology have been to provide low-cost, effective devices for semipermanently connecting the ends of optical fibers together, and to provide a low-cost, effective devices for switching an optical fiber from optical alignment with one optical fiber to optical alignment with another optical fiber.

With respect to the problem of providing suitable connectors for optical fibers, U.S. Pat. No. 4,087,155 entitled "Single Optical Fiber Connectors Utilizing Spherical Alignment Elements" to G. R. Deacon teaches an optical fiber connector formed by three mutually contacting spheres and the resulting interstitial spaced formed. Other U.S. Patents such as U.S. Pat. No. 4,050,783 entitled "Connectors for An Optical Fiber Link" to A. Tardy, U.S. Pat. No. 3,989,567 entitled "Connective Method for Two Optical Fibers having the Same Diameter" to A. Tardy, and U.S. Pat. No. 4,056,305 entitled "Single Optical Fiber Connector Utilizing Elastomeric Alignment Device" to R. MCCartney, et al. also teach various optical fibers positioned in an interstitial space formed by three mutually contacting elements having a circular cross-section. However, none of these patents teach the biasing of two optical fiber retainers, each possibly holding a plurality of optical fibers, against each other in a plurality of mechanically stable alignment positions and a switching mechanism to controllably move one retainer with respect to the other to cause switching of the optical connections formed, thereby forming an optical fiber relay.

The general problem of providing a relay apparatus for use with fiber optic technology has been an especially difficult problem. In order to create a optical connection between two optical fibers, the ends of the optical fibers must be in precise alignment. Not only must the ends of the optical fibers be in extremely close proximity or touching each other, but also the ends cannot be offset with respect to each other since any angular offset drastically hinders the transfer of a light signal from one optical fiber to another. Due to the small diameter of optical fibers it has been a significant technological problem to provide a simple, low-cost, low-loss switchable connection between optical fibers.

One approach to the problem has been to provide two plates sliding across each other between fixed positions. Each optical fiber end would be inserted through the back of one of the two plates to the surface of the plate in contact with the other plate. The optical fiber ends which are desired to be in optical alignment would be inserted into the plates at a position which would bring them into optical alignment at the desired fixed position of the plates. As one of the plates would slide across the other to one of its alternate fixed positions, a previously made optical connection would be broken and a new one could be created. Such an apparatus, although mechanically possible, requires a large number of high precision components. A method for fixing to a high degree of accuracy the alignment positions of the plates with respect to each other must be assured. Additionally a high precision method for precisely securing the ends of the optical fibers is also required. Environmental factors such as temperature and shock may adversely affect the critical alignment necessary to such a relay apparatus, creating a finicky and unreliable device.

Another method for providing a fiber optics relay apparatus is by use of a light-transparent crystal having an index of refraction which may vary in accordance with a voltage applied across it. By appropriate positioning of the optical fiber ends against the crystal, the light emitted from one optical fiber can, by adjustment of the crystal's index of refraction, by directed to one or more optical fibers, creating an electronically controlled fiber optic relay. The chief advantage of such a scheme is that the switching of the information from an optical fiber is electronically controlled since the index of refraction is determined by the voltage applied across the crystal. Accordingly, the information obtained from an optical fiber can be switched at a high rate of speed.

A major disadvantage of such a fiber optics relay apparatus is the signal being switched suffers a significantly large loss, e.g. 20 db or greater, due to the insertion of a crystal which has an index of refraction different from that of the optical fibers. In addition, additional losses are caused by impurities in the crystal, and by unavoidable diffusions, refractions, and reflections of the light signal within the crystal.

It is an object of the herein disclosed invention to provide a mechanically simple fiber optics relay which requires a minimum of high precision machining. It is a further objective of the herein disclosed invention to provide a low loss optical connection between two sets of optical fibers. Additionally, it is an objective to provide any switching configuration desired from single pole, single throw to multiple pole, multiple throw. It is also desired to provide a fiber optics relay apparatus which may be switched manually, electronically, hydraulically, or via any other desired control mechanism. Another objective of the invention is to provide a fail safe switching mechanism for the relay apparatus so that a failure of the switching control mechanism, e.g., power failure, will cause the relay apparatus to revert to a well-defined configuration, allowing for the optical connection of the optical fibers.

SUMMARY OF THE INVENTION

The herein disclosed invention provides for these and other objectives by providing for each of the two sets of optical fiber ends which are desired to be switchably connected a securing mechanism having a surface with lattice-like regularity which positions the optical fiber ends. The two lattice-like surfaces of the securing mechanisms are cooperatively formed to cause them to move into a set of mechanically stable minimum energy positions when they are biased together. These mechanically stable positions bring the two sets of optical fibers into optical alignment with each other.

In one embodiment, the cooperative surfaces of the two securing mechanisms are formed by hemispherically capped retainers. The retainers are tightly packed into a lattice-like structure, creating a set of tricuspid interstial spaces between the retainers. These interstial spaces are used to position the ends of the optical fibers. The geometry of the hemispherical caps cause the desired set of mechanically stable positions to be created between the two retainers. These positions serve to bring the optical fibers of one set into optical alignment with those of the other set. A switching mechanism is provided for moving one of the retainers with respect to the other from one mechanical stable position to another. In this manner, a relay for optical fibers requiring few high precision mechanical components is provided.

In one embodiment, only a subset of the interstitial spaces created are used, allowing the retainers for the optical fibers to move without rotation, reducing the rotational stresses on the optical fibers. In another embodiment of the invention, provision is made to rotate one retainer with respect to the other, creating a more compact relay apparatus having fewer parts.

BRIEF DESCRIPTION OF THE DRAWINGS

FIG. 1 is a top view of a moveable fiber optic retainer which is usuable in the inventive optical fiber relay of FIGS. 5 and 6.

FIG. 2 is a top view of a fixed optical fiber retainer which is useable in the inventive optical fiber relay of FIGS. 5 and 6.

FIG. 3 is a side view of the moveable and fixed optical fiber retainers illustrated in FIG. 1 and FIG. 2, whereby the moveable optical fiber retainer is shown in one of its alignment positions when it is biased against the fixed optical fiber retainer.

FIGS. 4A and 4B are top views of the moveable and fixed optical fiber retainers, illustrated in FIGS. 1, 2 and 3, showing the two alignment positions of the moveable optical fiber retainer with respect to the fixed optical fiber retainer.

FIG. 5 is a side view of an optical fiber relay in accordance with the present invention. This relay may use the retainers shown in FIGS. 1-4. The relay switching and bias mechanisms are shown.

FIG. 6 is a perspective view of the apparatus illustrated in FIG. 5.

FIG. 7 illustrates an alternative embodiment of a moveable retainer.

FIGS. 9A, 9B, and 9C illustrate another embodiment of the invention providing a single pole, double throw optical fiber relay in which the moveable optical fiber retainer is not rotated.

FIG. 10 illustrates an optical fiber retainer in another embodiment of the invention, providing additional interstitical spaces for retaining optical fibers.

FIG. 11 illustrates the lattice-like structure provided by this herein disclosed invention, permitting an arbitrary switching configuration by appropriate addition of optical fiber retainers.

DETAILED DESCRIPTION OF THE PREFERRED EMBODIMENTS

Figure 8:
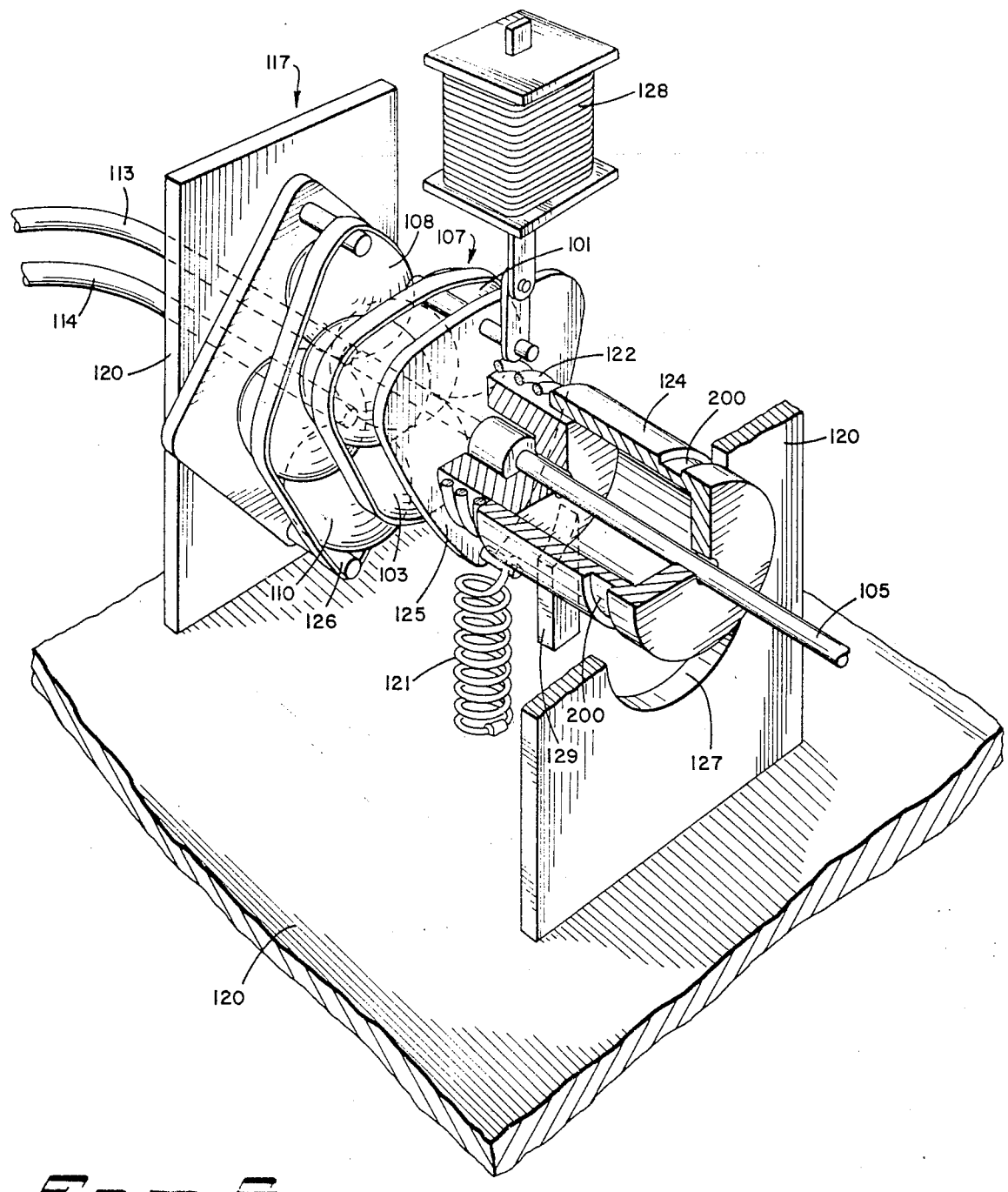
FIG. 8 illustrates another embodiment of a moveable retainer suitable for use in the herein disclosed invention.

Turning briefly to FIGS. 5 and 6, where an embodiment of the inventive optical fiber relay apparatus is illustrated, the invention provides for two cooperatively shaped retainers 107, 117 each of which securely positions a set of optical fibers. The two retainers are biased against each other, and one retainer, the "moveable" retainer 107 may be moved across the "fixed" retainer 117 by a switching mechanism, e.g., a solenoid 128 and spring 121. The moveable retainer 107, due to the cooperative shapes of the surfaces of the two retainers 107, 117 formed by retaining elements 101, 102, 103, 108, 109, 110, 111, seeks, when moved across the fixed retainer 117, to move into one of a specifiable set of mechanically stable positions with respect to the fixed retainer 117. These positions bring the optical fiber 105 positioned in the moveable retainer 107 selectively and alternatively into optical alignment with one or the other of the optical fibers positioned in the fixed retainer 117.

Although the embodiment of the invention illustrated in FIGS. 1 through 6 illustrate a single pole, double throw relay, it will be readily seen that the teachings of the invention are appropriate to create any desired switching configuration.

The basic geometry operative on the embodiment of the invention illustrated in FIGS. 5 and 6 is best explained by reference to FIGS. 1-4.

FIG. 1 illustrates an embodiment of a "moveable" retainer 107. It should be understood that the moveable retainer 107 is "moveable" with respect to the fixed retainer 117 only for convenience of language, and there are no special properties of the moveable retainer 107 or fixed retainer 117 which distinguish one from the other. The moveable retainer 107 securely positions one optical fiber 105 in the interstitial space 106 formed by three mutually contacting spherically shaped retaining elements 101, 102, 103. The three retaining elements 101, 102, 103 form a tricuspid interstitial space 106 which, due to the size of the retaining elements 101, 102, 103, is of size appropriate to securely retain an optical fiber 105. The optical fiber 105 is positioned in a direction normal to the plane formed by the center of the three retaining elements 101, 102, 103. Due to the tight geometrical lattice-like packing of the three retaining elements 101, 102, 103, a simple tension band 104 is sufficient to cause the three elements to maintain the desired configuration. This tension band 104 may be constructed of any of a variety of materials which may be elastic or nonelastic. Due to the basic geometry of the moveable retainer 107, the tension band 104 serves only to bias the retaining elements together, thereby stabilizing the various components of the moveable retainer 107 in the desired geometry configuration.

As is suggested by the geometry of the moveable retainer 107, more than three of the spherical retaining elements may be positioned in the lattice-like configuration to create a correspondingly greater number of interstitial spaces for use in positioning the ends of optical fibers. FIG. 2 illustrates this concept in the support of two optical fibers 113, 114.

FIG. 2 illustrates a "fixed" fiber optic retainer 117 for use in the embodiment of the invention portrayed in FIGS. 1 through 6. The basic triangular relationship between mutually contacting retaining elements is extended by a fourth retaining element. The four retaining elements 108, 109, 110, 111 forming the fixed retainer 117 create two interstitial spaces 116, 115 which are once again of size to securely position the end of two optical fibers 114, 113. Another tension band 112 serves to maintain the desired geometrical arrangement.

While triples of mutually contacting spherically shaped retaining elements from a convenient interstitial space for securely positioning an optical fiber, an additional advantage is obtained by retaining elements of such shape. Such triples of spherically shaped bodies, in addition to creating an interstitial space, also "nest" or interlock in a manner best illustrated in FIG. 3.

FIG. 3 illustrates a side view of the moveable 107 and fixed 117 retainers, showing how the spherical retaining elements of the moveable retainer 117 each contact at least two retaining elements of the fixed retainer 117. For instance, retaining element 110 of the fixed retainer 117 contacts retaining elements 101 and 102 of the moveable retainer 107. When the fixed 117 and moveable 107 retainers are in one of the mechanically stable positions, a plane of contact 130 is formed by the set of points of the two retainers in contact with each other. Although the mechanism is not shown in FIG. 3, the moveable retainer 107 is biased against the fixed retainer 117. The particular geometry of the retainers 107, 117 causes the mechanically stable positions of the moveable retainer 107 with respect to the fixed retainer 117 to be as illustrated in FIG. 3. In addition to coming into a mechanically secure position with respect to the fixed retainer 117, the moveable retainer 107 also has its interstitial space 106 and associated optical fiber 105 lined up with the corresponding interstitical space 116 and optical fiber 114 of the fixed retainer 117.

Inasmuch as spherically shaped retaining elements, such as metal ball bearings, are easily manufactured to high precision, the optical fibers positioned in the interstical spaces are located to a high degree of accuracy, allowing for precise optical alignment of the optical fibers within a minimum number of critical components.

FIGS. 4A and 4B illustrate the two mechanically stable positions of the moveable retainer 107 with respect to the fixed retainer 117 which creates the switchable optical connection desired by the herein disclosed invention.

In FIG. 4A the moveable retainer 107 and associated optical fiber 105 is positioned over the fixed retainer's optical fiber 114. Retaining elements 102 and 103 and optical fiber 105 are shown partially broken away to better portray the coaxial alignment of the two optical fibers 105, 114. FIG. 4B illustrates the second alignment position of the moveable retainer 107. In the position illustrated in FIGS. 4B, the moveable retainer 107 is nested above retaining elements 108, 109 and 111 of the fixed retainer 117. In this position, the optical fiber 105 of the moveable retainer 107 is in optical alignment with optical fiber 113 of the fixed retainer. (See FIG. 2) It should be noted that in order for the moveable retainer 107 to move from the first alignment position over optical fiber 114 to the second alignment position over optical fiber 113, the moveable retainer has been rotated 60 degrees. Although this rotation does not affect the alignment of the optical fiber 105 with the optical fibers 114, 113 positioned in the fixed retainer 117, in order to avoid injury to the optical fiber 105, this rotation must be permitted the optical fiber 105 by allowing suitable slack to the optical fiber 105 in the relay apparatus.

FIGS. 1 through 4B have illustrated the basic geometrical properties utilized in the herein disclosed invention. A more detailed illustration of the accompanying mechanical portions of one embodiment of the herein disclosed invention are illustrated in FIG. 5 and FIG. 6. The relay frame 120 has a guide slot 127 which restricts the movement of a retainer guide 124 via a cooperating groove 200 in the retainer guide 124. The moveable retainer 107 includes a retainer support 125 which secures the moveable retainer 107. The retainer support biases the moveable retainer 107 against the fixed retainer 117 and associated retainer support 126 via a bias spring 122. This bias spring 122 is positioned between the retainer support 125 for the moveable retainer 107 and the retainer guide 124. The moveable retainer support 125 contains a tubular protrusion about which the bias spring 122 is positioned. The cylindrical protrusion telescopes into the retainer guide 124, allowing the moveable retainer 107 to be moved across the surface of the fixed retainer 117 by allowing the moveable retainer 107 to separate from the fixed retainer 117 and to move away from one of the minimum energy, mechanically stable alignment positions. The fixed retainer 117 has an associated retainer support 126 which contains appropriate protrusions for fixed placement of it within the relay frame 120. Both the removeable retainer 107 and fixed retainer 117 are designed to be removeable from the relay frame 120 to allow easy insertion and positioning of the corresponding optical fibers without interference by the other elements of the relay apparatus.

As FIG. 3 illustrates, when an optical fiber is inserted in an interstitial space, the basic geometry of the space which aligns the end of the optical fiber parallel to the axes of the retaining elements and perpendicular to the place formed by the centers of the retaining elements. To assure a low loss optical connection, the optical fiber is inserted sufficiently to cause it to come into extremely close contact or actual contact with the fibers of the other retainer. Of course, each optical fiber should not protrude too far beyond the plane of contact 130 formed by the retainers when they are in one of these mechanically stable alignment positions. This prevents one optical fiber from clashing or striking another fiber with which it is seeking to come into alignment, thereby preventing damage to the optical fibers and insuring the formation of the desired optical connection.

The moveable retainer 107 and associated retainer support 125 are moved between its two alignment positions with respect to the fixed retainer 117 by an electromagnetic solenoid 128 and a spring 121.

Of course, the scope of the invention should not be limited to a switching mechanism comprising an electromagnetic solenoid and spring inasmuch as suitable manual means for moving the moveable retainer 107, as well as hydraulic, mechanical, or other such control systems are apparent to those skilled in the art as being suggested by the spirit and scope of the invention.

As illustrated in FIG. 6, both the spring 121 and solenoid 128 are attached to the moveable retainer support 125 in a manner which encourages the retainer support 125 and associated moveable retainer 107 to rotate as the moveable retainer 107 moves from one alignment position to the other. The spring 121 and solenoid 128 are pivotably fastened to the retainer support 125 in an offset manner, so as to encourage the moveable retainer 107 to rotate when the solenoid 128 is not powered or power is removed from the solenoid.

The spring 121 causes the moveable retainer 107 to move into a fixed and specifiable alignment position, creating a reliable optical connection even though power may not be available. This is an advantage in the use of the device in that the formation of a predetermined optical connection is never endangered by failure of the switch control system.

In addition to the offset pivot points of the spring 121 and solenoid 128 to the moveable retainer support 125, a deflector 129 is attached to the relay frame 120, which serves to force the moveable retainer support 125 to rotate when the retainer support 125 is being moved under influence of the spring 121. This deflector 129 insures the desired rotation of the moveable retainer support 125 and associated moveable retainer 107 to the alignment position.

Although the embodiment of the invention illustrated in FIGS. 1 though 6 use spherical retaining elements, alternative shapes for the retaining elements are possible. FIG. 7 illustrates an additional embodiment of the invention, wherein retaining elements 101', 102', 103' are cylindrically shaped and have a hemispherical cap. FIG. 7 illustrates a moveable retainer corresponding to FIG. 1 in the earlier discussed embodiment of the invention. Once again, this embodiment uses a portion of a sphere to determine the cooperative shapes of fixed and moveable retainers. In the embodiment illustrated in FIG. 7, although the interstitial space has the same sectional shape as the embodiment illustrated in FIG. 1, the retaining elements contact the optical fiber 105 along a greater length. Such an embodiment better stabilizes the optical fiber 105.

FIG. 8 illustrates an additional embodiment of the invention wherein retaining elements 101", 102", 103" have a shape caused by removing a section of a sphere. So long as the section removed from the retaining element is above the plane of contact 130 which the moveable retainer 107 forms when in contact with the fixed retainer 117 in the mechanically stable, minimum energy alignment positions, a suitably shaped retaining element for use in the invention is provided.

Inasmuch as the mechanically stable adjustment positions of the fixed 117 and moveable 107 retainers is solely determined by the size, shape, and position of the portions of the two retainers which are in contact with each other at the alignment positions, the retainers may have any desired shape so long as the positions in contact at the alignment positions are unaffected. In one embodiment of the invention, the fixed retainer 117 could be made of a material having less surface hardness than that of the moveable retainer 107. After being put into use, the movement of the moveable retainer 107 across the fixed retained 117 causes an indentation to be worn into the fixed retainer 117 which, although not affecting the alignment of the optical fibers, assists in the smooth and reliable positioning of the moveable retainer 107 with respect to the fixed retainer 117. Of course, other embodiments of the invention may comprise a moveable retainer which would have the lesser surface hardness if such a configuration is optimal for the desired switching configuration.

The embodiment of the invention illustrated in FIGS. 1 through 6 provides for a moveable retainer 107 which rotates 60 degrees between alignment positions. In an alternative embodiment, illustrated in FIGS. 9A, 9B, and 9C, an additional retaining element 131 is incorporated in a fixed retainer 117'. This creates a new interstitial space 137 in addition to the two previously formed interstitial spaces 115, 116. In this embodiment of the invention, no optical fiber is placed in interstitial space 115, but rather the optical fiber 113' is placed in the newly formed interstitial space 137. FIG. 9B illustrates the moveable retainer in one of the alignment positions. FIG. 9C illustrates the moveable retainer 107 in another of the mechanically stable alignment positions centered over the newly created interstitial space 137 and associated optical fiber 113'. It will be noted that in this embodiment of the invention, the moveable retainer 107 does not rotate when moved between the two indicated alignment positions. This elimination of rotation of the moveable retainer 107 is at the expense of an additional retaining element 131 and the corresponding greater size of the resulting relay apparatus.

Although the embodiments of the invention previously discussed have been for a single pole, double throw switching configuration, the teachings of the herein disclosed invention are appropriate for use in any desired switching configuration of whatever number of poles and whatever number of throws. As is illustrated in FIGS. 10 and 11, additional retaining elements may be incorporated into either the fixed or moveable fiber optic retainers to create any desired number and arrangement of interstitial spaces for positioning optical fibers. By creating an appropriate lattice of retaining elements 132, an appropriate number of interstitial spaces 133 may be created into which the desired set of optical fibers may be positioned. A well-defined set of mechanically stable alignment positions will be created in the same manner as was done in the embodiments discussed above. If it is not desired to rotate a moveable fiber optic retainer with respect to the fixed retainer when it is moved between alignment positions, appropriate choice of the interstitial spaces used for positioning optical fibers will provide such a relay at the expense of otherwise unnecessary retaining elements.

Although only a limited number of embodiments of the herein disclosed invention have been described, it will be apparent to those skilled in the art that changes and modifications may be made without departing from the spirit and scope of the invention. For instance, it is readily apparent that a suitable optical fiber retainer may be formed as a unitary piece in which, the retaining elements and the tension band member are all part of the unitary structure. In addition, any of a variety of dome-like surfaces including regular polyhedral shapes may be incorporated into a retaining element to form the inventive cooperatively shaped optical fiber retainers. Accordingly, the foregoing disclosure, description, and FIGURES are for illustrative purposes only and do not in any way limit the invention which is only defined by the claims.

What is claimed is:

1. An apparatus for switchably establishing an optical connection between the end of a first optical fiber and the end of a member of a set of optical fibers, comprising:

first means for mechanically securing said first optical fiber near the end;

second means for mechanically securing each optical fiber of said set of optical fiber near its end;

bias means for biasing said first means and said second means against each other;

said first and second means having cooperative surfaces shaped to cause said first means to assume one of a specifiable set of mechanically stable positions against said second means when biased by said bias means, said positions including an alignment position in which the end of said first optical fiber is in optical alignment with the end of an optical fiber of said set;

switch means for moving said first and second means with respect to each other between said alignment position and other of said mechanically stable positions;

said cooperative surfaces of said first and second means each including plural similarly sized dome-like projections from said first and second means, respectively.

2. An apparatus according to claim 1, comprising:

retaining elements, each having a dome-like end and configured to form an interstitial space able to retain an optical fiber when three of said retaining elements are placed in contact with each other;

said first means comprising a first set of at least three said retaining elements, said first optical fiber being retained in the interstitial space formed by said at least three retaining elements;

said second means comprising a second set of retaining elements having at least four retaining elements, each contacting at least two other said elements in said second set to form at least two of said interstitial spaces;

each fiber of said second set of optical fiber being retained in a respective one of said at least two interstitial spaces; and said first and second means cooperative surfaces including some of said retaining element dome-like ends.

3. An apparatus according to claim 2 wherein said first means has a different number of retaining elements from said second means.

4. An apparatus according to claim 2 wherein the retaining elements of said first and second means are of generally the same size and shape.

5. An apparatus according to claim 2 wherein the retaining elements of at least one of said first means and second means are tightly packed together into a regular lattice-like configuration.

6. An apparatus according to claim 2 wherein each of said retaining elements dome-like end is hemispherical, some of the hemispherical ends of the elements of said first means facing and contacting some of the hemispherical ends of the elements of said second means; and said cooperating surfaces determined by said hemispherical ends.

7. An apparatus according to claim 2, wherein each said retaining elements comprise spheres, and said second set of retaining elements have their centers in a common plane.

8. An apparatus according to claim 2 wherein said second set of retaining elements comprises seven retaining elements six of said retaining elements arranged in a circle about and contacting the seventh retaining element, thereby forming at least six of said interstitial spaces.

9. An apparatus according to claim 2 wherein said second set of retaining elements comprise N members, where N is more than three and less than eight, all but one member of said set of second retaining means circularly arranged around the remaining member to form at least N−2 said interstitial spaces.

10. An apparatus according to claim 2 wherein said switch means laterally moves the retaining elements of said first means into selective contact with selectively different subsets of retaining elements of said second means.

11. An apparatus according to claim 1 wherein said switch means uses electrical power to move said first means and second means with respect to one another, and wherein said switch means comprises a spring for moving said first and second means with respect to each other to a designated one of said mechanically stable positions when electrical power is not available to said switch means.

12. An apparatus according to claim 1 wherein said first and second means are constrained by said switch means to move laterally without rotation with respect to each other between a subset of said mechanically stable positions.

13. An apparatus according to claim 1 wherein said first means may rotate to enter one said mechanically stable positions.

14. An apparatus according to claim 13 wherein said first means may rotate 60 degrees when moved between said mechanically stable positions.

15. An apparatus according to claim 1 wherein said first optical fiber, when in optical alignment with one of said set of optical fibers, comes into physical contact with said optical fiber.

16. An apparatus according to claim 11 wherein said switch means comprises:

an electrical solenoid, connectable to said first means, able to move said first means and second means laterally with respect to one another from one of said mechanically stable positions to another of said positions.

17. An apparatus according to claim 2 wherein said first set of retaining elements and second set of retaining elements have different hardnesses.

18. An apparatus according to claim 7 wherein said spheres comprise metal ball bearings.

19. A fiber optic relay for controllably establishing optical connections between the ends of a first set of optical fiber and the ends of a second set of optical fiber, comprising:

a relatively stationary fixed support means for securely retaining said first set of optical fiber near their ends;

a relatively moveable support means for securely retaining said second set of optical fiber near their ends;

bias means for biasing said moveable support means against said fixed support means;

said fixed support means and moveable support means having surfaces cooperatively shaped to cause said moveable support means, when biased against said fixed support means, to assume a specific set of stable positions against said fixed support means;

said stable positions including an alignment position which brings an optical fiber end from said first set into optical fiber from said second set;

switch means for moving said moveable support means from one of said stable positions to another of said stable positions; and said fixed and moveable support means' cooperative surfaces each including plural dome-like projections.

20. A fiber optic relay according to claim 19 wherein said cooperative surface of said fixed support means comprise a first set of similarly sized hemispheres having their centers in a common plane, and wherein said cooperative surface of said moveable support means comprises a second set of similarly sized hemispheres having their centers in a common plane.

21. A fiber optic relay according to claim 20 wherein said first set of hemispheres are tightly packed in a lattice-like manner to cause each said hemisphere to contact at least two other mutually contacting hemispheres of said first set to form a tricuspid interstitial space, the first set of hemispheres thereby creating a first set of interstitial spaces; and wherein said second set of hemispheres are similarly packed to create a second set of tricuspid interstitial spaces;

said first set of optical fiber ends being positioned in some of said first set of interstical spaces; and said second set of optical fiber ends being positioned in some of said second set of interstical spaces.

22. A fiber optic relay according to claim 21 wherein the diameter of hemispheres in said first set and second set of hemispheres is of length to cause said first and second set of interstitial spaces to be of size to tightly retain said first and second set of optic fiber ends respectively.

23. A fiber optic relay according to claim 20 wherein said hemispheres are formed by metal spheres.

24. A fiber optic relay according to claim 20 with said first set of optic fibers having two members and said second set of optic fibers having one member, wherein said fixed support means comprises four hemispheres arranged in a diamond to form two interstitial spaces for retaining of said first set of optic fibers;

wherein said moveable support means comprises three hemispheres arranged in a triangle to form one interstitial space for retaining said second set of optic fibers; and wherein said stable positions include two alignment positions, thereby forming a single pole, double throw optic relay.

25. A fiber optic relay according to claim 20 wherein the points in contact between said first and second means when said first and second means are in one of said stable positions form a common plane of contact and some of said hemispheres of said first or second means in contact have a section removed not affecting the points in contact.

26. A fiber optic relay according to claim 19 wherein said cooperative surface of said fixed support means comprise a first set of domes having their center in a common plane, and wherein said cooperative surface of said moveable support means comprises a second set of similar sized domes having their centers in a common plane.

27. A fiber optic relay switch according to claim 26 wherein said domes have a shape similar to a portion of the surface of a regular polyhedral solid.

28. A device for providing selective optical connection between a first optical fiber and a selectable one of a set of other optical fibers, comprising:

first and second optical fiber retainers situated facing each other and being laterally and axially moveable relative to each other;

said first retainer comprising a set of at least three rigid members each having a like circular cross-section and held together in parallel axial arrangement with said first optical fiber caught in the interstice therebetween, the ends of said members facing said second retainer, each being generally dome shaped;

said second retainer comprising a complementary set of at least four rigid members each having a like circular cross-section and held together in parallel axial arrangement with respective ones of said set of other optical fibers caught in corresponding intersticies therebetween, the ends of said members facing said first retainer each being generally domed shaped;

axial biasing means for urging the domed ends of said first retainer to mutually interdigitating, mechanically stable engagement with a first subset of the domed ends of said second retainer, whereby the end of said first optical fiber is aligned with the end of one of said set of other optical fibers; and selective positioning means for laterally moving said first retainer relative to said second retainer, said biasing means then urging the domed ends of said first retainer into mutually interdigitating, mechanically stable engagement with a second subset of domed ends of said second retainer, whereby the end of said first optical fiber is aligned with the end of another of said set of other optical fibers.

29. A device according to claim 28 wherein the ends of the rigid members of said first and second retainers having a generally hemispherical shape.

30. A device according to claim 27 wherein at least one of said first and second retainers has its rigid members tightly contacting each other in a regular lattice-like arrangement.

* * * * *